Nov. 16, 1926.  1,607,164
A. H. LEIPERT ET AL
CUSHION CONNECTION FOR VEHICLE CONSTRUCTION
Filed Jan. 29, 1925
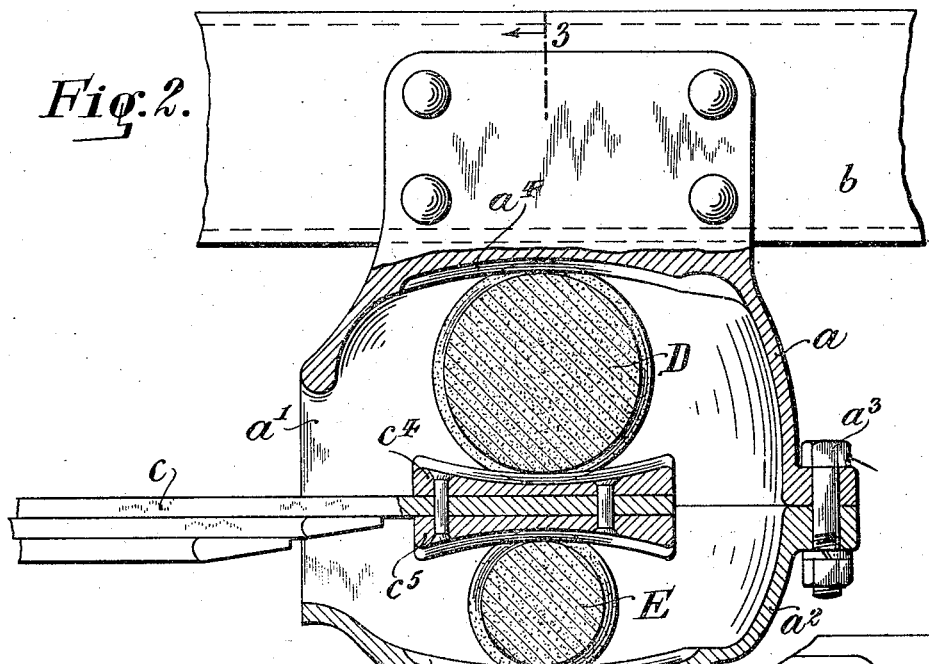
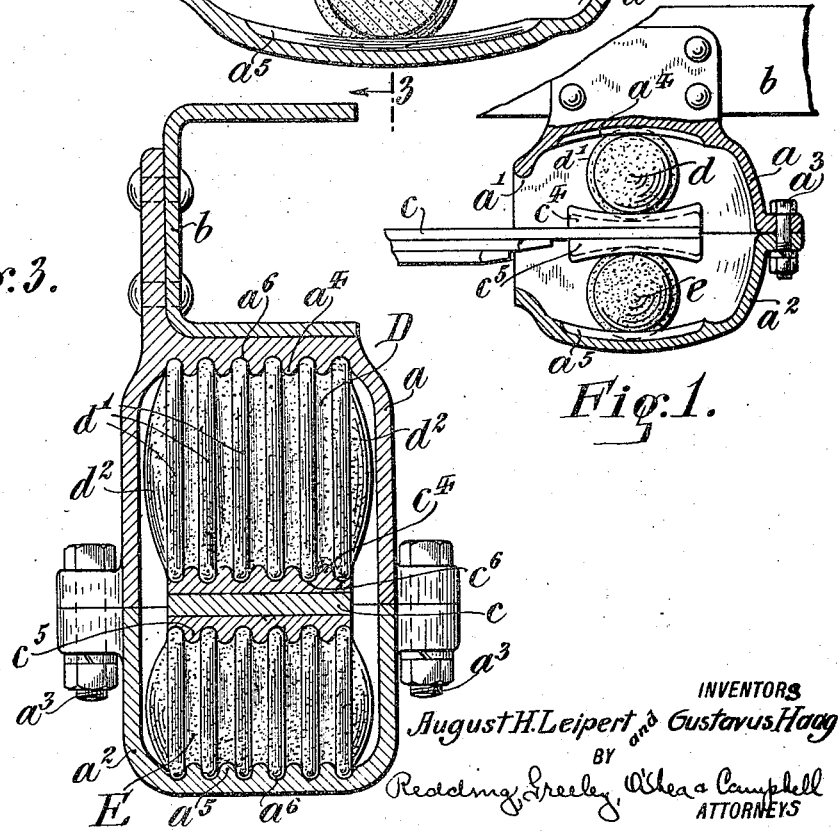
INVENTORS
August H. Leipert and Gustavus Haag
BY
Redding, Greeley, O'Shea & Campbell
ATTORNEYS Patented Nov. 16, 1926.

1,607,164

UNITED STATES PATENT OFFICE.

AUGUST H. LEIPERT AND GUSTAVUS HAAG, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed January 29, 1925. Serial No. 5,444.

In the copending application Ser. No. 715,387, filed May 23, 1924, by the applicants, there is disclosed a yielding non-metallic connection and support between the end of a leaf spring and the frame of a motor vehicle in which the end of the spring is retained between bodies of curvilinear form carried with the frame with capacity for relative movement therebetween. The present invention has to do with improvements in spring connections of the same general nature. In some situations the centers of rotation of the curvilinear bodies upon the respective upper and lower sides of the spring end have a tendency to become displaced with respect to one another so that they do not lie in the same vertical plane with the result that this disposition affects adversely the effective length of the spring. It is an object of the present invention to provide a construction which shall have a tendency to maintain the centers of rotation of the curved bodies substantially always in the same vertical plane. To this end the seats for the curved bodies are curved. Preferably the curved elements of the seats extend in the longitudinal direction of the spring. In the preferred embodiment of the invention the curved bodies take the form of cylindrical rollers formed of yielding nonmetallic material which, to overcome side-sway, are formed with grooved surfaces which co-operate with correspondingly grooved surfaces formed on the seats. The rollers are disposed between the seats on the end of the spring under compression whereby their strength, resiliency and wearing qualities are improved. Other objects and advantages of the invention will be more apparent from the following detailed description of the invention illustrated in the accompanying drawings, in which:

Figure 1 is a view in side elevation and partly in section showing the non-metallic connection according to the present invention.

Figure 2 is a view similar to Figure 1 but showing a variation in the relative size of the rollers.

Figure 3 is a transverse vertical sectional view taken in the plane indicated by the line 3—3 in Figure 2 and looking in the direction of the arrows and showing the co-operating grooved surfaces on the rollers and seats.

In the preferred embodiment of the invention illustrated in Figure 1 a housing $a$ is illustrated as secured to the chassis frame, a fragmentary portion of which is indicated at $b$. Housing $a$ is formed with an opening $a'$ through which the end of the vehicle spring $c$ extends. Between the end of the spring $c$ and the upper and lower walls of the housing $a$ are disposed curved bodies $d$, $e$, of yielding non-metallic material. So much of the invention as has just been described is covered broadly in the co-pending application. For convenience in assembly, housing $a$ may be formed of a main portion and a cap portion $a^2$, the line of separation of the two parts being substantially in the transverse horizontal plane of the spring $c$ under normal conditions. The cap $a^2$ may be secured to the housing in any convenient manner as by the bolts $a^3$.

In some situations it may be found advisable to maintain the centers of rotation of the curved bodies $d$ and $e$ in substantially the same transverse vertical plane. To this end the co-operating seats for the said bodies $d$ and $e$ in the housing and on the spring end are curvilinear in form, the curved elements of the seats extending in the longitudinal direction of the spring. The seats in the housing are indicated in Figure 1 at $a^4$ and $a^5$, respectively. The co-operating seats on the end of the spring $c$ have been designated by the reference characters $c^4$ and $c^5$, respectively. The curved bodies $d$ and $e$ in the preferred embodiment take the form of cylinders of the same diameter. It will thus be seen that as the end of the spring tends to travel inwardly or outwardly within the housing under varying degrees of spring elongation due to change in load or inequalities in the roadbed, the rollers $d$ and $e$ will have a constant tendency to turn with the movement of the spring so that their axes remain always in the same vertical transverse plane. Thus the effective length of the spring $c$ may be varied by the movement of the rollers resulting from increased load, etc., in a manner which will be readily appreciated by those skilled in the art. Upon assembly the desired degree of compression may be exerted upon the rollers $d$ and $e$ by tightening bolts $a^3$.

It may be desirable to vary the respective diameters of the rollers as illustrated in Figures 2 and 3. Since the greatest load will be obviously transmitted through the upper roller D, Figure 2, that roller may be made greater in diameter than the roller E.

In actual practice it will be found that there is a tendency for relative movement transversely between the spring and chassis frame, such as side-sway. Such side-sway is objectionable and as a means for overcoming the same, the seats $a^4$, $c^4$, $c^5$ and $a^5$ may be formed with a plurality of longitudinally extending grooves, the deepest portions of which are in register and the rollers themselves may also be formed with co-operating raised portions $d'$ to enter the grooves. As the rollers are under compression when disposed between the seats their axial length will be increased proportionately to the degree of compression to which they are subjected. In consequence the raised portions $d'$ are moulded with a width less than the width of the grooves $a^6$ and $c^6$ and the grooves are spaced from one another slightly greater than the distance between the raised portions $d'$. When the cylinders are placed under compression the increase in axial length causes a bulge $d^2$ to be formed at either end of the cylinder which serves as a cushion, not in contact ordinarily with the walls of the housing $a$ but so disposed as to serve as buffers or cushioning elements under conditions of violent side-sway.

The yielding non-metallic material of which the rollers are composed preferably takes the form of rubber as the strength, resiliency and life of this material is substantially increased when so retained.

Various modifications may be made in the application of the co-pending parts as well as the relative sizes of the rollers and the radius of curvature of the seats and no limitation is intended by the foregoing description or appended drawings except as indicated in the accompanying claims.

What I claim is:

1. In a wholly non-metallic mechanical connection and support between the spring and frame of a motor vehicle, opposed curvilinear seats carried with the frame and between which the end of the spring extends, the curved portions having their longitudinal axes extending in the direction of the vehicle frame, opposed curvilinear seats carried with the end of the spring and co-operating with the seats carried with the frame, and curved bodies of yielding non-metallic material curved to co-operate with the seats and disposed between the seats respectively.

2. In a wholly non-metallic mechanical connection and support between the spring and frame of a motor vehicle, opposed seats mounted on the frame, co-operating seats carried by the spring and non-metallic yielding roll elements disposed between the respective seats, a plurality of said seats being curved so that longitudinal movement of the spring will cause the non-metallic elements to be compressed as they roll to accommodate such movements.

3. In a wholly non-metallic mechanical connection and support between the spring and frame of a motor vehicle, a housing carried with the frame and having an open side into which the end of the spring extends, opposed curvilinear seats formed in the housing, the axes of the curvilinear portions being curvilinear, opposed curvilinear seats carried with the end of the spring and co-operating with the seats in the housing, and bodies of yielding non-metallic material curved to co-operate with the seats and disposed between the seats respectively.

4. In a wholly non-metallic mechanical connection and support between the spring and frame of a motor vehicle, a housing carried with the frame and having an open side into which the end of the spring extends, opposed curvilinear seats formed in the housing, opposed curvilinear seats carried with the end of the spring and co-operating with the seats in the housing, the axes of the curvilinear elements of said seats extending in the longitudinal direction of the frame, and cylinders of yielding non-metallic material disposed between the seats respectively.

5. In a wholly non-metallic mechanical connection and support between the spring and frame of a motor vehicle opposed curvilinear seats carried with the frame and between which the end of the spring extends, opposed curvilinear seats carried with the end of the spring and co-operating with the seats carried with the frame, said seats being respectively formed with longitudinal grooves and cylinders of yielding non-metallic material disposed between the seats respectively and formed with raised portions co-operating with the grooves in the seats.

6. In a wholly non-metallic mechanical connection and support between the spring and frame of a motor vehicle, a housing carried with the frame and having an open side into which the end of the spring extends, opposed curvilinear seats formed in the housing, opposed curvilinear seats carried with the end of the spring and co-operating with the seats in the housing, said seats being respectively formed with longitudinal grooves, cylinders of yielding non-metallic material disposed between the seats respectively, and formed with raised portions co-operating with the grooves in the seats.

7. In a wholly non-metallic mechanical connection and support between the spring and frame of a motor vehicle, a housing carried with the frame and having an open side into which the end of the spring extends, opposed curvilinear seats formed in the housing, opposed curvilinear seats carried with the end of the spring and co-operating with the seats in the housing, said seats being respectively formed with longitudinal grooves, cylinders of yielding non-metallic material disposed between the seats respectively and formed with raised portions co-operating with the grooves in the seats, the grooves of said seats being normally spaced a greater distance from one another than the normal spacing of the raised portions of the cylinders.

8. As an article of manufacture, a yielding non-metallic element adapted to be disposed between the end of a spring and the frame in a motor vehicle, comprising a cylinder of yielding non-metallic material formed with a circumferentially grooved outer surface.

9. In a wholly non-metallic mechanical connection and support between two relatively movable parts, a non-metallic yielding roll element disposed between the parts and rolling with respect to each when transmitting varying forces between the supporting and supported members, the contacting part of the element comprising portions, the axes of the configurations of which lie at an angle to the vertical plane through the rolling axis of the element, and seats on the respective parts co-operating with the surface of the rolling element.

10. In a wholly non-metallic mechanical connection and support between the spring and frame of a motor vehicle, opposed seats carried with the frame and between which the end of the spring extends, seats carried by the end of the spring and co-operating with the first named seats, and non-metallic yielding roll elements disposed between the seats and rolling with respect to the surfaces of the seats when transmitting varying forces therebetween, the contacting part of the rolls comprising portions, the axes of the configurations of which lie at an angle to the vertical plane through the rolling axis of the respective elements the surfaces of the seats co-operating with the surfaces of the rolls.

This specification signed this 24th day of January, A. D. 1925.

AUGUST H. LEIPERT.
GUSTAVUS HAAG.